US006704449B1

United States Patent
Ratner

(10) Patent No.: US 6,704,449 B1
(45) Date of Patent: Mar. 9, 2004

(54) METHOD OF EXTRACTING TEXT FROM GRAPHICAL IMAGES

(75) Inventor: Alan S. Ratner, Clarksville, MD (US)

(73) Assignee: The United States of America as represented by the National Security Agency, Washington, DC (US)

(*) Notice: Subject to any disclaimer, the term of this patent is extended or adjusted under 35 U.S.C. 154(b) by 564 days.

(21) Appl. No.: 09/691,168

(22) Filed: Oct. 19, 2000

(51) Int. Cl.[7] .......................... G06K 9/34; G06K 9/00; G06K 9/46; G06K 9/68; H04N 1/46
(52) U.S. Cl. ................... 382/176; 382/164; 382/190; 382/198; 382/218; 358/515
(58) Field of Search .......................... 382/161, 162, 382/164, 165, 173, 176, 181, 185, 190, 194, 198, 218, 229, 290, 292; 358/462, 505, 515, 520, 523, 530; 345/589, 590, 600, 604

(56) References Cited

U.S. PATENT DOCUMENTS

| 4,656,665 A | * | 4/1987 | Pennebaker ................. 382/172 |
| 4,942,388 A | * | 7/1990 | Reitman ..................... 345/690 |
| 5,010,580 A | | 4/1991 | Vincent et al. |
| 5,272,764 A | | 12/1993 | Bloomberg et al. |
| 5,418,951 A | | 5/1995 | Damashek |
| 5,542,007 A | | 7/1996 | Chevion et al. |
| 5,579,407 A | | 11/1996 | Murez |
| 5,659,631 A | | 8/1997 | Gormish et al. |
| 5,664,031 A | | 9/1997 | Murai et al. |
| 5,687,252 A | | 11/1997 | Kanno et al. |
| 5,745,596 A | * | 4/1998 | Jefferson ..................... 382/176 |
| 5,761,339 A | | 6/1998 | Ikeshoji et al. |
| 5,809,167 A | * | 9/1998 | Al-Hussein ................. 382/190 |
| 5,848,186 A | | 12/1998 | Wang et al. |
| 5,883,973 A | * | 3/1999 | Pascovici et al. ........... 382/176 |
| 5,900,953 A | | 5/1999 | Bottom et al. |
| 5,930,783 A | | 7/1999 | Li et al. |
| 6,137,907 A | * | 10/2000 | Clark et al. ................. 382/180 |
| 6,175,425 B1 | * | 1/2001 | Khorram ..................... 358/1.9 |
| 6,466,209 B1 | * | 10/2002 | Bantum ....................... 345/589 |

OTHER PUBLICATIONS

Compuserve Incorporated; A standard defining a mechanism for the storage and transmission of raster–based graphics information; Jun. 15, 1987; Columbus Ohio.

Compuserve Incorporated, Graphics Interchange Format; Jul. 31, 1990; Columbus, Ohio.

SCIENCE, Damashek, Mark, vol. 267, p. 843–848, Feb. 10, 1995.

* cited by examiner

Primary Examiner—Andrew W. Johns
Assistant Examiner—Amir Alavi
(74) Attorney, Agent, or Firm—Laubscher Law Office

(57) ABSTRACT

A method for extracting text from images whereby the intensity of each color plane of the image is identified, the color plane with the highest intensity is converted into a black and white image, and character recognition is performed on the black and white image to determine the text of the image. The method can be used for textual word searches for Graphics Image Format (GIF) images as well as Joint Photographic Experts Group (JPEG) images, thereby providing the capability to perform text searches for images found on web pages of the World Wide Web.

7 Claims, 4 Drawing Sheets

METHOD OF EXTRACTING TEXT FROM GRAPHICAL IMAGES

BACKGROUND OF THE INVENTION

1. Field of the Invention

The present invention relates to a method for extracting text from an image which is typically displayed on web pages of the World Wide Web.

2. Description of the Related Art

World Wide Web search engines typically search web pages for keywords appearing as text. In addition, visual search engines, such as AV Photo Finder available through AltaVista.com, search for images resembling conceptual keywords such as face or horse. Neither of these methods is suitable for searching for keywords appearing within graphical images on web pages. The present invention overcomes these shortcomings by presenting a method of extracting textual words from graphical images on web pages to allow keyword searching on these images.

Graphical images on web pages are typically logos, clip art, function buttons (typically labeled "Submit", "Cancel", "OK", etc.), or photographs, many of which include text within the image. This image text may not necessarily appear as searchable text (such as in ASCII format) on the web page. These images are typically in either Graphics Interchange Format (GIF) or Joint Photographic Experts Group format (JPEG).

The GIF format allows an image to present up to 256 different composite colors, as defined in the header of the GIF file. Each composite color is represented by three color components (or channels) or red, green and blue (RGB) with intensity levels varying from 0 to 255. Black is represented by (R,G,B)=(0, 0, 0), white by (255, 255, 255) and full intensity red by (255, 0, 0).

The JPEG format allows a much wider range of composite colors to more accurately represent the continuous range of colors present in photographic images. In JPEG 24-bit images, for example, over 16 million composite colors may be used. The JPEG color channels (typically luminance and chrominance to maximize file compressibility) may be readily converted into RGB (red, green, and blue) color components.

Various methods are known in the general art of image recognition. Several of these methods involve analyzing single images where the images are associated with a scanner of a photographic development system. One such method is taught by the patent to Ikeshoji, et al., U.S. Pat. No. 5,761,339 which discloses separating a background image from image data, processing the background image by a maximum filter, comparing the brightness of each pixel constituting said image data with the brightness of peripheral pixels, and replacing it with the maximum brightness. This method only evaluates the image with respect to the varying degrees of pixel brightness within the image. The Gormish, et al., U.S. Pat. No. 5,659,631 discloses a data compression system that separates input into color planes prior to compressing the image. Additionally, the image data could be coded using pixel information as context. This method utilizes color planes in its evaluation of the underlying image. Furthermore, the patent Vincent, et al., U.S. Pat. No. 5,010,580 discloses a system for extracting handwritten or typed information from forms that have been printed in colors other than the color of the handwritten or typed information. The information extraction system includes a detector for detecting color values for scanned pixel locations on a printed form; a comparator for comparing the color values with reference color values; and identifier for identifying ones of the scanned pixel locations that have color values that correspond to the reference color values; an optical character recognition engine for receiving data regarding the identified locations.

The present invention was developed to overcome the drawbacks of the prior art and to provide improved image evaluation and extraction methods characterized by identifying the number of unique intensity levels present in each of the color components of the subject image, reducing the number of intensity levels to a small number (if necessary), converting each of the remaining number of intensity levels for each color component to a black and white image, reversing all black and white pixels within the image if the number of black pixels exceeds the number of white pixels, performing character recognition of each black and white image, evaluating the text output by the character recognizer to determine success or failure, and stopping the processing when the text is successfully or all intensity levels for all color components have been processed.

BRIEF SUMMARY OF THE INVENTION

Accordingly, a primary object of the present invention is to provide a method and system for quickly and efficiently extracting text from a graphical image that is typically found on a web page, characterized by the steps of separating the image into its color components, determining the image intensity levels contained within the color planes of each of said color components, respectively, scanning in a pixel-by-pixel manner for at least one first color component the color plane of said first color component having the highest intensity level, comparing the intensities of successive color pixels with said highest color intensity level and generating corresponding black and white pixels for those color pixels having intensities equal to and other than said highest intensity level, respectively, and recognizing the text characters of the black pixels in the event that the number of white pixels exceeds the number of black pixels. In the event that the number of black pixels exceeds the number of white pixels, converter means reverse the colors of the black and white pixels before recognition of the text by the text recognizing means.

According to one embodiment of the invention, the color levels of a first color component of the image are scanned by the scanning means. According to a second embodiment, intensity lever comparison means are used to determine the highest color plane of any of the color components that is to be scanned by the scanning means.

According to a more specific object of the invention, the method for recognizing text within a colored image includes identifying the intensity of each color plane of the image, and then selecting the color plane with the highest intensity level. The text of the image is then extracted from the determined color plane. The extracted text is converted into a black and white image, whereupon an evaluation takes place to determine if there are more black pixels on the resultant image than there are white pixels. If there are more black pixels, the image is inverted, thus changing every black pixel to a white pixel, and likewise, every white pixel into a black pixel. After the image has been properly formatted with the appropriate white and black pixel arrangement, a character recognition engine evaluates the black and white image to determine the textual characters. If the character recognition engine is successful, the method is complete. However, if the recognition was not successful, the next lowest intensity level of the initial selected color plane is identified, and the text extraction and character recognition process is repeated. If this process does not yield a positive character recognition result, the method evaluates the color plane which has the next smallest intensity level in relationship to the first color plane that was selected, and the same evaluation method is performed on that color plane. If that process does not yield a successful recognition, the third color plane is evaluated. If the third color plane does not yield a successful recognition, the text of the image will not be recognizable by this method.

The character recognition will be determined to be successful by comparing the extracted text to a lexicon of legitimate words, computing the likelihood of the sequence of characters (e.g. "Qxv" is highly unlikely in English, whereas "com" is relatively common), or character recognition software which can provide a confidence measure for each character based upon how well its pixels matched the nominal template or features.

BRIEF DESCRIPTION OF THE SEVERAL VIEWS OF THE DRAWINGS(S)

Other objects and advantages of the invention will be apparent from a study of the following specification when viewed in the light of the accompanying drawings, in which.

DETAILED DESCRIPTION OF THE INVENTION

Figure 1:
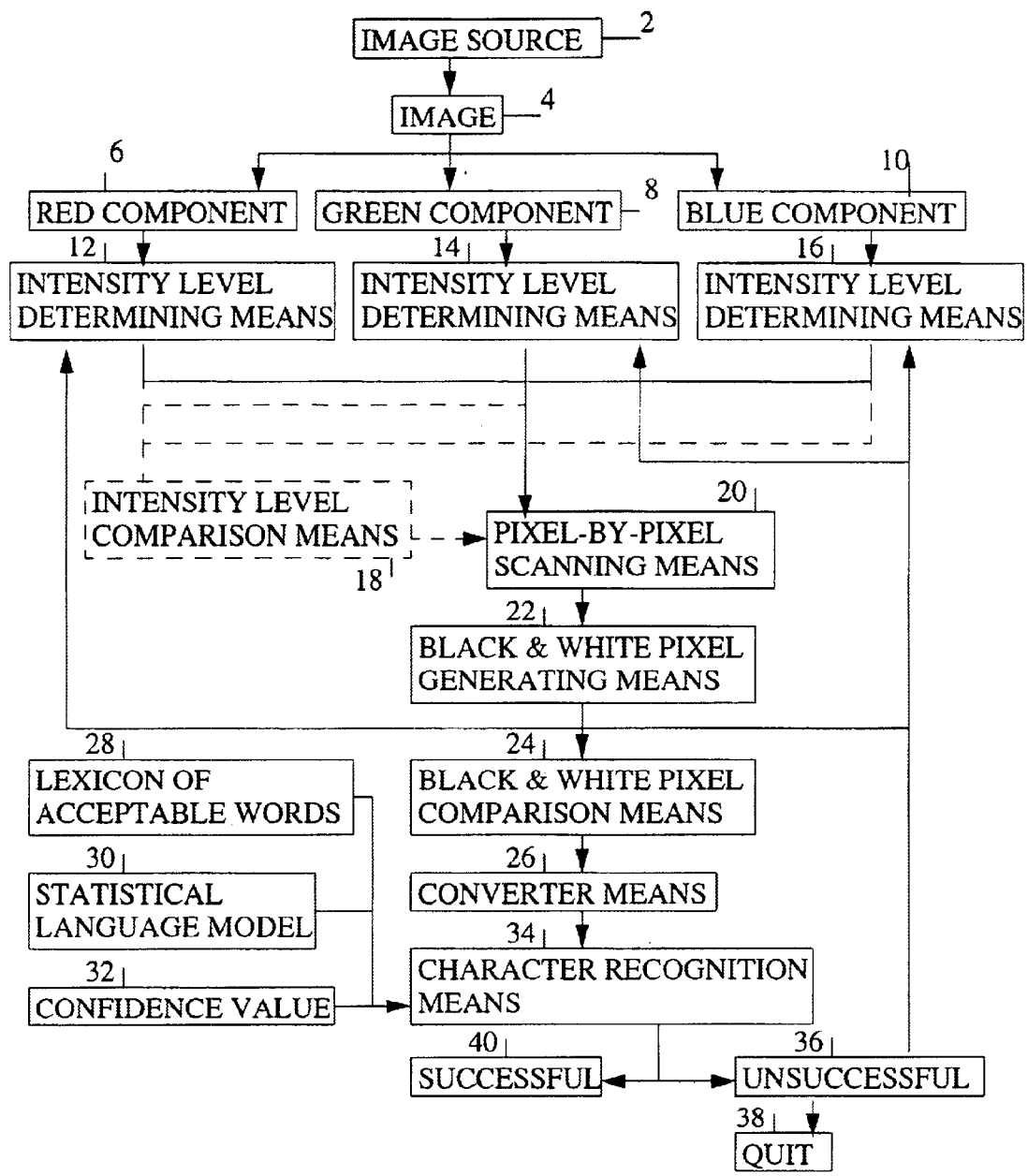
FIG. 1 is a block diagram illustrating the text extraction process.

As generally illustrated in FIG. 1, an image source means 2 provides an image 4 which has a red component 6, a green component 8, and a blue component 10. The intensity level determining means 12 determines the various intensity levels of the red color component 6. The intensity level determining means 14 determines the various intensity levels of the green color component 8. The intensity level determining means 16 determines the various intensity levels of the blue color component 16. In one embodiment of the invention, an intensity level comparison means 18 determines which of the three color components has a single highest intensity level and then selects that color component with the determined highest intensity level. A pixel-by-pixel scanning means 20 evaluates each pixel of the selected color plane. The black and white pixel generating means 22 converts each pixel that matches the selected intensity level to black, and in the event that a match does not occur, changes the pixel to white. A black and white pixel comparison means 24 compares each pixel to the current intensity level for the current color component and if a match exhists the pixel is set to black, otherwise the pixel is set to white. A converter means 26 inverts the overall black and white image if the image has more than 50% black pixels by changing every black pixel to a white pixel and every white pixel to a black pixel. The character recognition means 34 evaluates the black and white image against either a lexicon of acceptable words 28, a statistical language model 30, or a confidence value 32 to determine the success factor of the character recognition. In the event that the character recognition was successful 40, the processing will stop. In the event that the character recognition was unsuccessful 36 processing returns to an unprocessed color component of either the red component 6, green component 8, or blue component 10, or if there are additional intensity levels to be processed for the current color component, processing returns to the intensity level determining means 12, 14, or 16, respectively for each color. If after all of the intensity levels for all of the color components have been processed and a text identification was not successful, the processing will quit 38.

Figure 2:
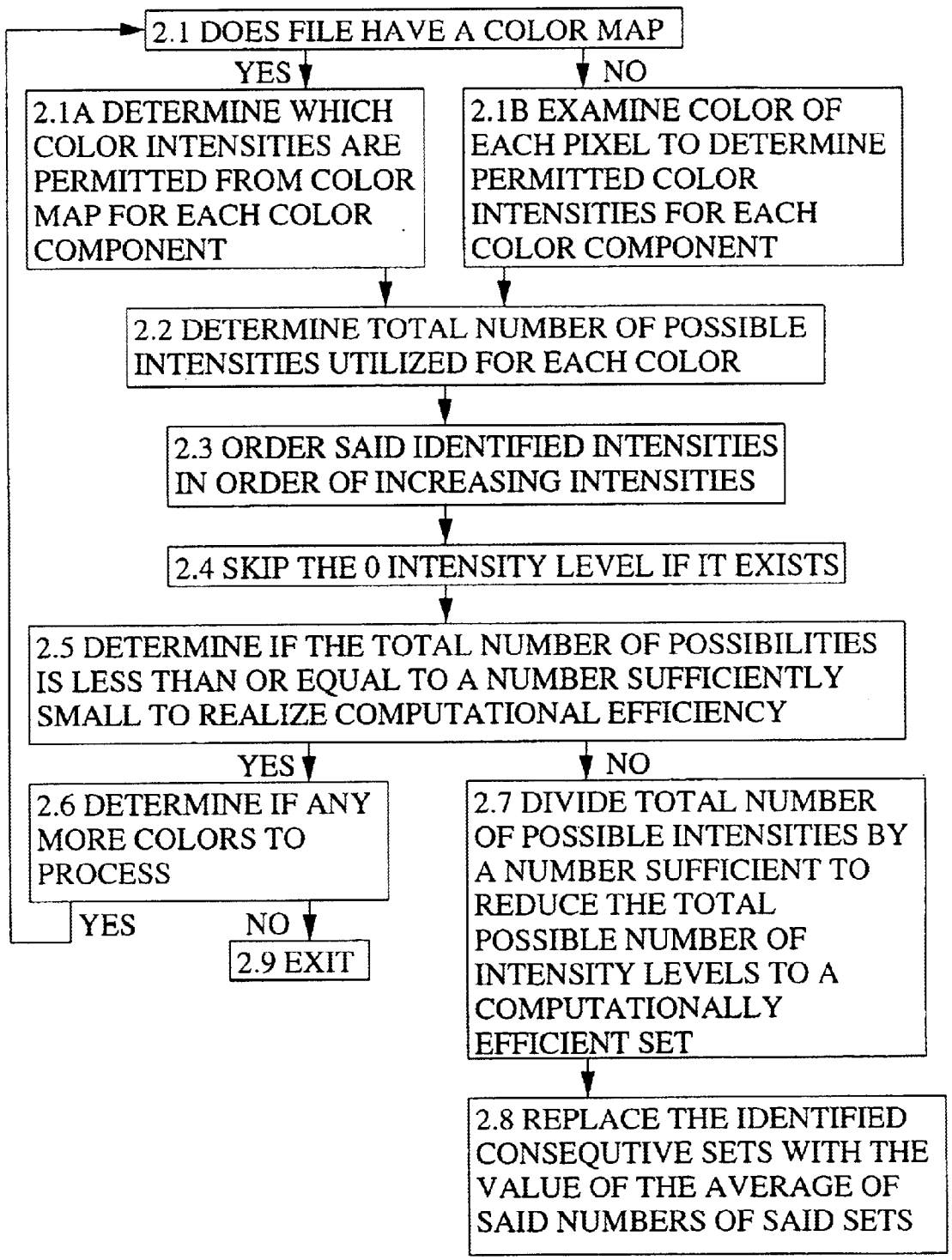
FIG. 2 is a block diagram for the process of performing color component resolution reduction.
Figure 3:
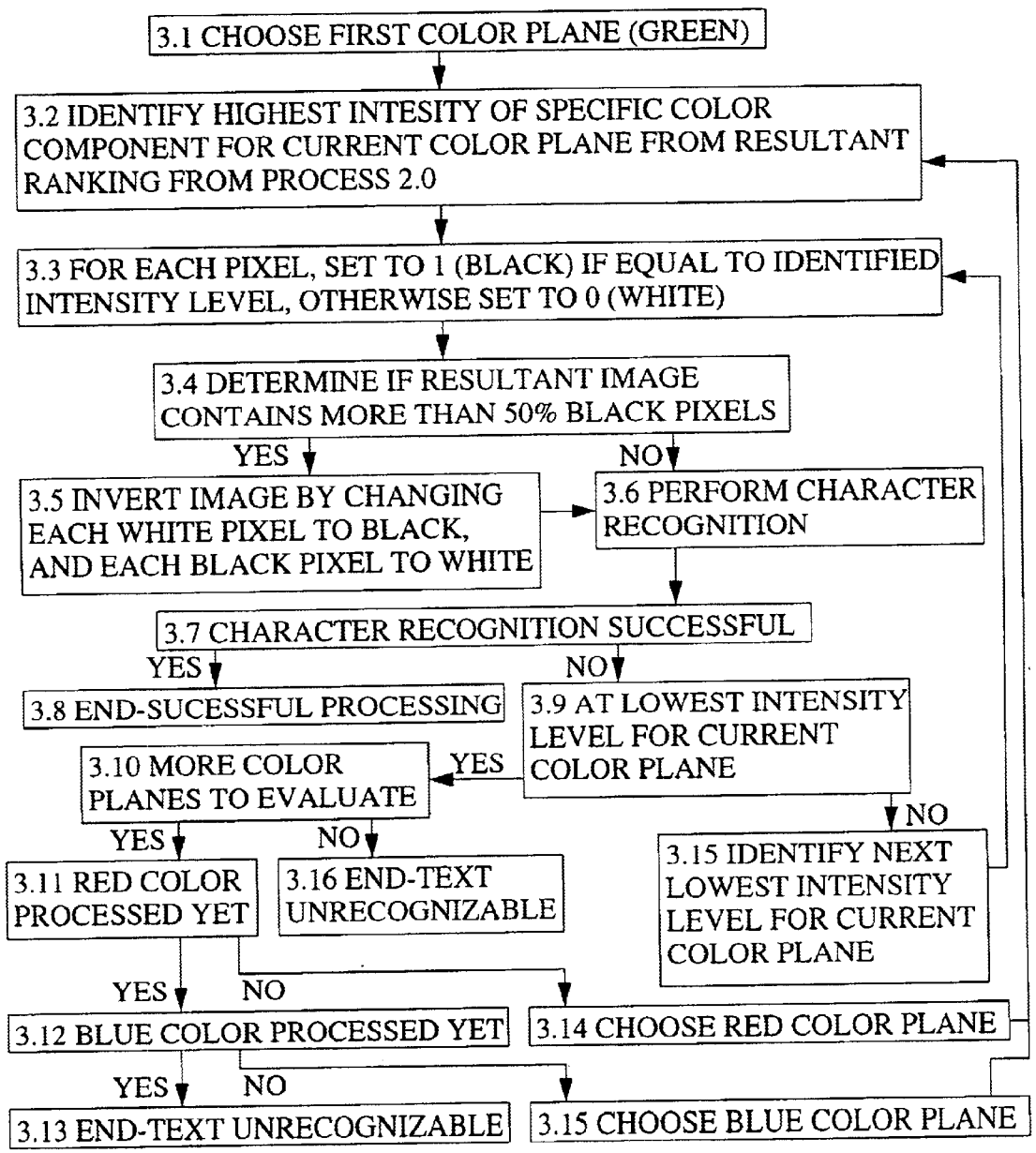
FIG. 3 is a block diagram for the process of generating and evaluating the black and white images; and, FIG. 4 is a block diagram for the process of determining if the character recognition was successful.

Referring now to FIG. 2, in order to perform color component reduction, it is first determined if the obtained image has an associated color map 2.1, in its file header. If it does, the system then determines which color intensities are permitted from the color map for each color component 2.1a. If the image does not have a color map in its file header, the system examines the color of each pixel to determine the permitted color intensities for each color component 2.1b. Next, the total number of possible intensities utilized for each color are determined 2.2. The said identified intensities are then ordered in increasing intensities 2.3. If a 0 intensity level exists, it is skipped 2.4. Next, the system determines if the total number of possibilities is less than or equal to a number sufficiently small enough to realize computational efficiencies 2.5. If the number is less than or equal to an appropriate number, the system determines if there are any additional colors to process 2.6. If there are additional colors to process, processing returns to 2.1. If there are not additional colors to process the system exits 2.9. If the number is not less than or equal to an appropriate number, the system divides the total number of possible intensities by a number sufficient to reduce the total possible number of intensity levels to a computational efficient set 2.7. The system then replaces the identified consecutive sets with the value of the average of said numbers of said sets 2.8.

Figure 4:
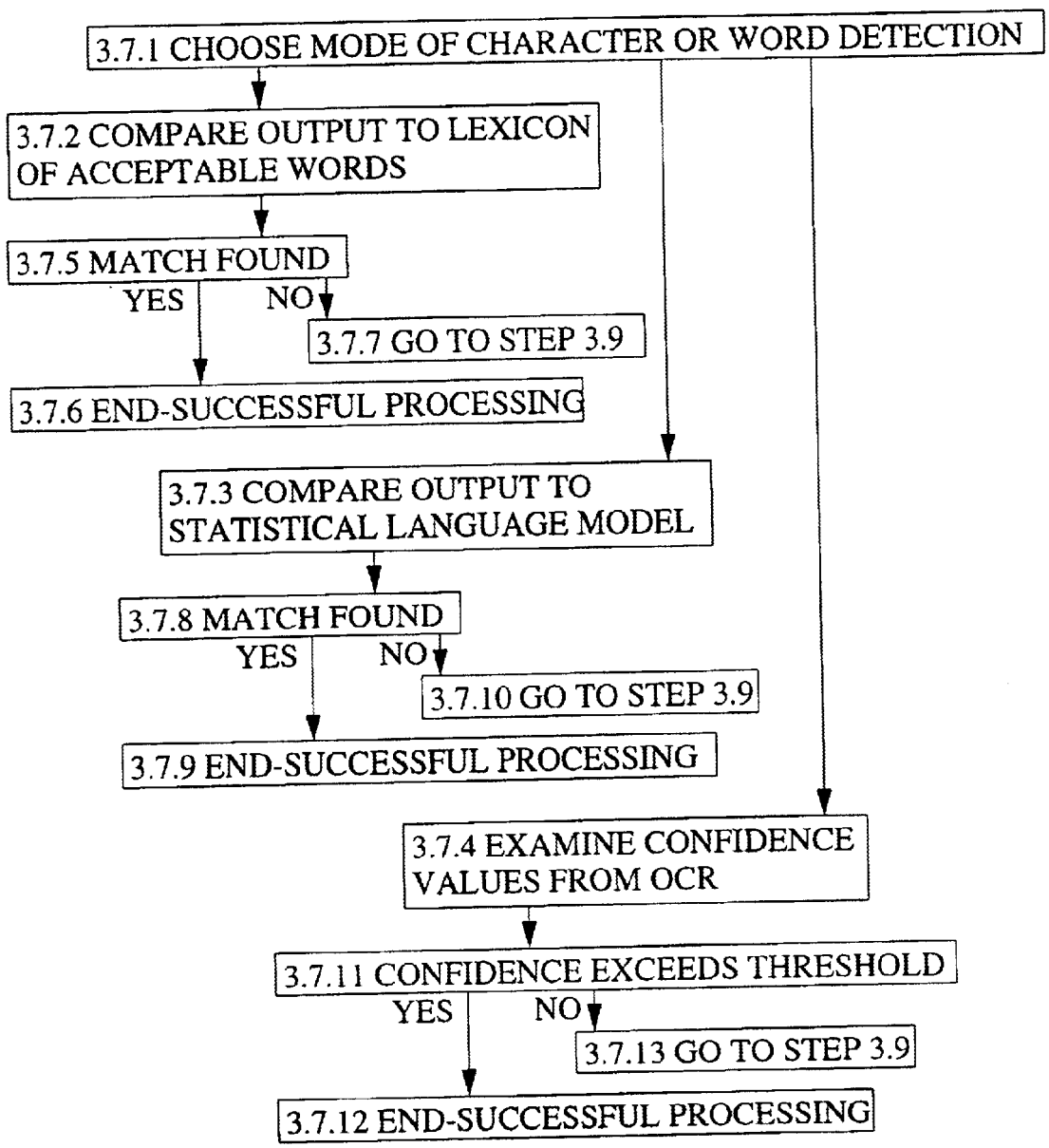

After performing the color component resolution reduction 2.0, the system generates and evaluates black and white images 3.0. The first step in generating and evaluating black and white images, which can be seen if FIG. 4, is to choose a first color plane 3.1, which could be designated as green. Next, the highest intensity of a specific color component for the current color plane from the resultant rankings from 2.0 is identified. The said identified intensity level is then processed by, setting each pixel to 1 (black) if it is equal to the identified intensity level, or otherwise to 0 (white) 3.3. It is then determined 3.4 if the resultant image contains more than 50% black pixels. If it does, the image is inverted 3.5 by changing each white pixel to black, and each black pixel to white. If the resultant image does not contain more than 50% black pixels, the system performs character recognition 3.6 on the image. Likewise, after inverting the image 3.5, the system performs character recognition 3.6 on the image. It is then determined if the character recognition was successful 3.7.

The determining of the success of the character recognition 3.7 of FIG. 4, is further presented in FIG. 5, in which a specific mode of character or word detection is selected 3.7.1. After the mode is selected, the output is compared either to a lexicon of acceptable words 3.7.2, compared to a statistical language model 3.7.3, or examined for confidence values from the Optical Character Resolution device. If a match is found 3.7.5 from the lexicon of acceptable words 3.7.2, processing ends as the text was determined 3.7.6. However, if a match was not found 3.7.7, processing continues with 3.9. If a match is found from the statistical language model 3.7.3, processing ends as the text was determined 3.7.9. However, if a match was not found 3.7.10, processing continues with 3.9. If the confidence level exceed a threshold value 3.7.1 1 for the confidence levels of 3.7.4, processing ends as the text was determined 3.7.12. Otherwise, if a match was not found 3.7.13, processing continues with 3.9.

If the character recognition 3.7 was successful, processing is terminated 3.8 as the system recognized the image. If the recognition is not successful, the system determines if it is analyzing the lowest intensity level for the current color plane. If it is, the system determines if there are more color planes to evaluate 3.10. If it is not at the lowest intensity for the current color plane, the next lowest intensity level for the current color plane is identified 3.15, and processing returns to 3.2. If there are not more color planes to evaluate from 3.10, processing ends as the text is unrecognizable 3.16. If there are more color planes to evaluate 3.10, the system determines if the red color plane has been processed yet. If it has not, the red color plane is selected 3.14, and processing returns to 3.2. If the red color plane has been processed 3.11, the system determines 3.12 if the blue color plane has been processed. If it has, processing stops 3.13 as the text is unrecognizable. If it has not, the blue color plane is chosen 3.15 for processing, and the processing continues with 3.2.

As a consequence of the invention, it becomes possible to extract text from a graphical image in a direct, efficient, and inexpensive manner.

While in accordance with the provisions of the Patent Statutes, the prepared form and embodiment of the invention has been illustrated and described. It will become apparent to those skilled in the art that changes may be made without deviating from the invention as set forth above.

What is claimed is:

1. A method for extracting text from an image having green, red, and blue color planes at least one of which includes at least one first area having an intensity level that exceeds a predetermined value, comprising the steps of:
   (a) obtaining an image from an image source;
   (b) separating said image into its red, green, and blue color components each having a plurality of color levels;
   (c) determining the image intensity levels contained with the color planes of each of said color components, respectively;
   (d) scanning on a pixel-by-pixel basis for at least one first color component the color plane having the highest intensity level;
   (e) comparing the intensities of successive color pixels with said highest intensity level of said first color component, and generating corresponding black pixels for those color pixels having intensities equal to said highest intensity level, and white pixels for those color pixels having intensity levels that are not equal to said highest intensity level;
   (f) comparing the total number of black pixels with the total number of white pixels;
   (g) converting in the event that the number of black pixels exceeds the number of white pixels the black pixels to white pixels and the white pixels to black pixels, respectively; and
   (h) recognizing the text characters of the resultant black pixels.

2. A method for extracting text as defined in claim 1, and further including the intermediate step of:
   (i) repeating said scanning step, in the event that no text character is successfully recognized, for a lower intensity level of a color plane of said first color component.

3. A method for extracting text as defined in claim 2, and further including the intermediate step of:
   (j) repeating said scanning steps, in the event that no text character is successfully recognized, for the highest intensity level of the color plane of a second color component.

4. A method for extracting text as defined in claim 3, and further including the intermediate step of:
   (k) repeating said scanning step, in the event that no text character is successfully recognized, for a lower intensity color plane of said second color component.

5. A method for extracting text as defined in claim 1, wherein said text character recognizing step includes:
   (l) comparing the image of the black and white pixels with a source of standard text values.

6. A method for extracting text as defined in claim 1, and further including the intermediate step of:
   (i) comparing the intensity level of each of the color components, said first color component comprising that color component having the highest intensity level.

7. A method for extracting text as defined in claim 6, and further including the intermediate steps of:
   (j) determining the number of color plane intensities for each of said color components;
   (k) arranging said color plane intensities for said color components in descending order; and
   (l) determining a representative sampling number of said color plane intensities for transmittal to said scanning means.

\* \* \* \* \*